(12) United States Patent
Yoshida

(10) Patent No.: US 9,317,405 B2
(45) Date of Patent: Apr. 19, 2016

(54) TEST DOUBLE GENERATION

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/170,208

(22) Filed: Jan. 31, 2014

(65) Prior Publication Data

US 2015/0220424 A1    Aug. 6, 2015

(51) Int. Cl.
G06F 11/36    (2006.01)
(52) U.S. Cl.
CPC .................................. *G06F 11/3684* (2013.01)
(58) Field of Classification Search
CPC .................................................. G06F 11/3684
USPC .......................................................... 717/124
See application file for complete search history.

(56) References Cited

U.S. PATENT DOCUMENTS

| 2007/0033442 A1* | 2/2007 | Tillmann et al. ................. 714/45 |
| 2007/0277158 A1* | 11/2007 | Li et al. .......................... 717/135 |
| 2009/0282289 A1* | 11/2009 | Nori et al. ........................ 714/38 |
| 2010/0242029 A1* | 9/2010 | Tkachuk et al. .............. 717/135 |

OTHER PUBLICATIONS

Tillman et al. 'Unit Tests Reloaded: Parameterized Unit Testing with Symbolic Execution', 2006.*
Le Gall et al. 'Symbolic Execution Techniques for Refinement Testing' 2007.*

* cited by examiner

*Primary Examiner* — Li B Zhen
*Assistant Examiner* — Viva Miller
(74) *Attorney, Agent, or Firm* — Maschoff Brennan

(57) ABSTRACT

A method to generate test double proxies for callee functions of a function under test may include generating an initial set of test double proxies with abstract test stubs for all callee functions called by the function under test. Each of the test double proxies in the initial set of test double proxies may correspond to a different one of the callee functions. The method may also include generating a first refined set of test double proxies that includes a first refined test stub instead of a first one of the abstract test stubs for a first test double proxy in the initial set of test double proxies in response to determining that refining the first one of the abstract test stubs improves a test coverage of the function under test.

12 Claims, 12 Drawing Sheets

TEST DOUBLE GENERATION

FIELD

The embodiments discussed herein are related to test double generation.

BACKGROUND

As usage of electronic devices increases, so does the number of software programs run on these devices. Typically when a software program is developed, it is verified to help assure that the software program satisfies all of the predetermined requirements for the software program. Test doubles are often used in place of callee functions when testing a particular function that calls the callee functions to reduce the complexity of testing the particular function. However, test doubles may reduce coverage of the particular function and/or may create false paths.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to generate test double proxies for callee functions of a function under test may include generating an initial set of test double proxies with abstract test stubs for all callee functions called by the function under test. Each of the test double proxies in the initial set of test double proxies may correspond to a different one of the callee functions. The method may also include generating a first refined set of test double proxies that includes a first refined test stub instead of a first one of the abstract test stubs for a first test double proxy in the initial set of test double proxies in response to determining that refining the first one of the abstract test stubs improves a test coverage of the function under test.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
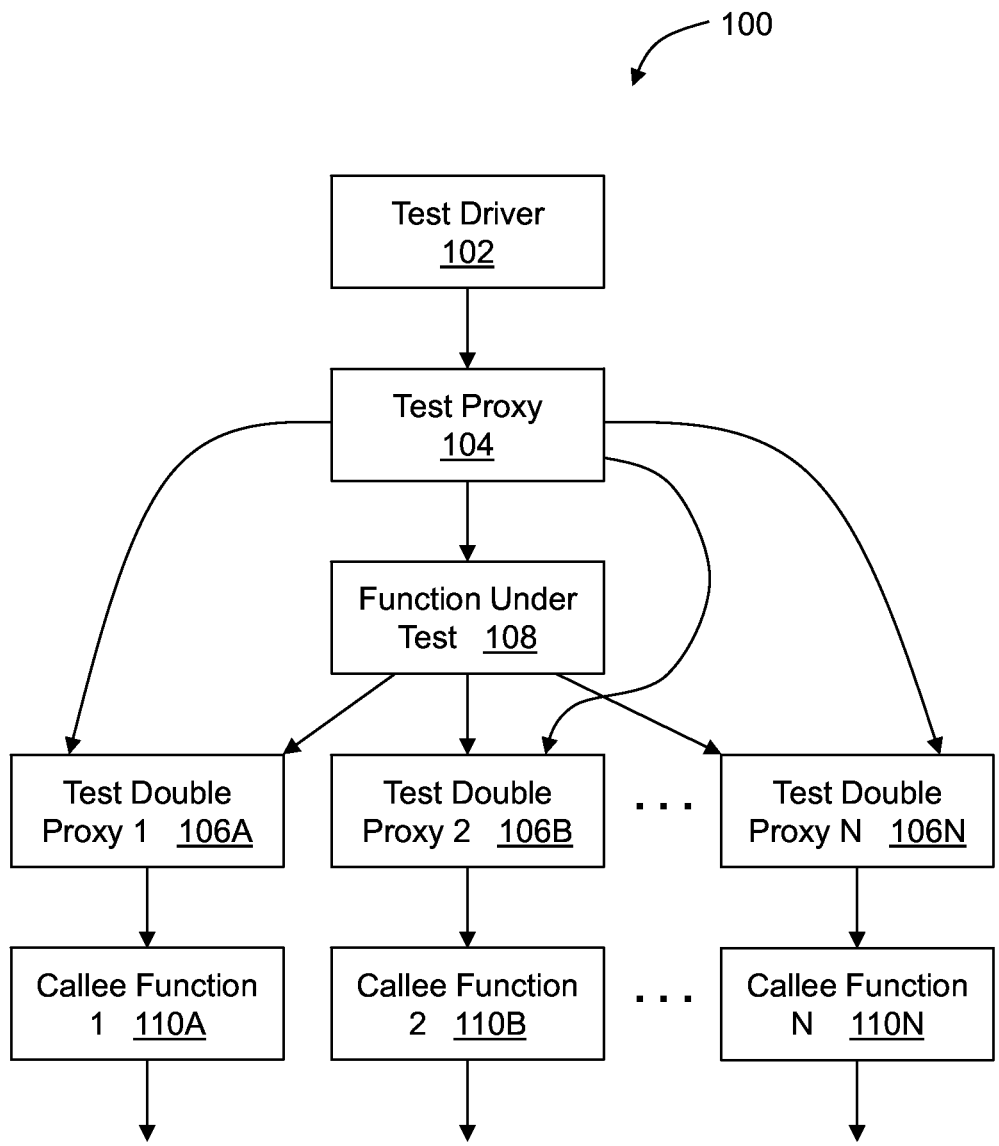
FIG. 1 illustrates an example software test tool.

FIG. 1 illustrates an example software test tool 100, arranged in accordance with at least one embodiment described herein. The software test tool 100 may include a test driver 102, a test proxy 104, and one or more test double proxies 106A-106N (collectively "test double proxies 106"). The software test tool 100 may be configured to test or verify a function under test 108.

The function under test 108 may be a function included in source code and/or a software product undergoing verification and/or other testing. The verification and/or other testing may include unit testing. The function under test 108 and/or the corresponding source code/software product may be in any of a variety of programming languages, including C++, C#, Java, or other programming languages. The function under test 108 may include function calls to one or more callee functions 110A-110N (collectively "callee functions 110").

The test driver 102 may be configured to generate the test proxy 104 and the test double proxies 106. The test proxy 104 may include a parameterized usage scenario of the function under test 108. The test proxy 104 may call the function under test 108 and may include compilable source code that applies conditions to the parameters or other variables within the function under test 108. Aspects regarding test proxies, such as the test proxy 104 of FIG. 1, are disclosed in U.S. patent application Ser. No. 13/828,886, filed Mar. 14, 2013 and U.S. patent application Ser. No. 14/170,217, titled TEST CONTEXT GENERATION, filed concurrently herewith, which applications are herein incorporated by reference.

The test driver 102 may also be configured to generate multiple sets of one or more inputs, referred to as test input patterns, and to test the function under test 108 using the test proxy 104 and the test input patterns. For each test input pattern, the test driver 102 may be configured to check whether the result matches an expected result. If a result matches an expected result, the test driver 102 may determine that the function under test 108 passes when executed with the corresponding test input pattern. On the other hand, if the result does not match the expected result, the test driver 102 may determine that the function under test 108 fails when executed with the corresponding test input pattern, indicating a bug or error in the source code/software product that includes the function under test 108. A user, such as a developer of the source code/software product that includes the function under test 108, may be notified of the failure and may take remedial measures to correct the bug or error.

As previously indicated, the function under test 108 may call the callee functions 110. To better isolate the function under test 108 for testing, e.g., for unit testing, test doubles may be used. A test double may generally include a simplified version of a callee function that reduces complexity and facilitates testing. Examples of common test doubles include test stubs, mock objects, test spies, fake objects, and dummy objects. A standard test double may be implemented by replacing the callee function in the source code with the test double. A test double proxy, such as the test double proxies 106 of FIG. 1, may be implemented by replacing, in the function under test, a call to the callee function with a call to the test double proxy and by including the test double proxy in the test proxy or in a common file with the test proxy. Test double proxies may be inserted without modifying the source code by replacing the call to the callee function with the call to the test double proxy in the function under test using code preprocessor macros, a modified compiler and linker, and/or a runtime implementation modification.

Accordingly, and with continued reference to FIG. 1, the software test tool 100 may include the test double proxies 106. The test double proxies 106 may include a same interface as the callee functions 110 such that the test double proxies 106 may accept a same number and type of inputs and/or provide a same number and type of outputs as the callee functions 110. More particularly, the test double proxy 106A may include a same interface as the callee function 110A, the test double proxy 106B may include a same interface as the callee function 110B, and the test double proxy 106N may include a same interface as the callee function 110N. However, the test double proxies 106 may be simpler than the callee functions 110. As an example, the callee function 110A may accept one or more inputs, may perform some complex computations using the inputs, and may return one or more outputs based on the complex computations. In contrast, the test double proxy 106A may accept the same inputs and may return a particular value as an output without performing any computations, or may perform relatively simple computations using the inputs to generate and return the output.

Figure 2:
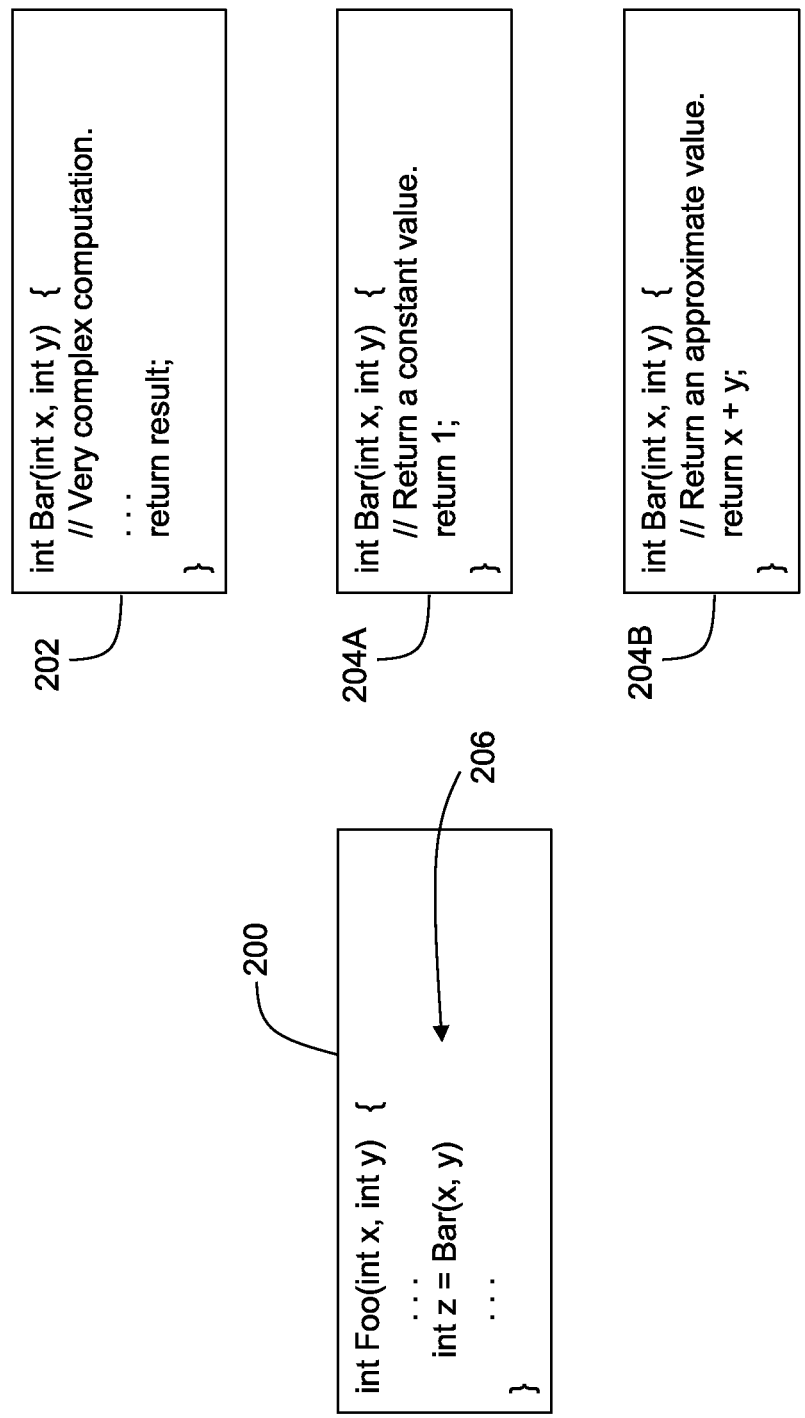
FIG. 2 illustrates an example function under test, an example callee function, and example test doubles.

FIG. 2 illustrates an example function under test 200, an example callee function 202, and example test doubles 204A and 204B (collectively "test doubles 204"). The function under test 202 calls the callee function 202 at line 206 of the function under test 200. The function under test 202 may include other statements or code, as indicated by ellipses. The presence of ellipses in other functions or source code in the figures similarly indicates the potential inclusion therein of other statements or code.

The callee function 202 may accept two inputs or arguments, x and y, both integers, and may return a result. The callee function 202 may perform a complex computation. Performing the complex computation of the callee function 202 while testing the function under test 200 may slow the testing of the function under test 200 and/or may make it more difficult to pinpoint any errors identified during testing as it may not be clear whether the errors occur in or arise from the function under test 200 or the callee function 202.

To simplify testing of the function under test 200, one of the test doubles 204 may be substituted for the callee function 202. The test doubles 204 may include the same interface as the callee function 202. In particular, the test doubles 204 each accept two inputs or arguments, x and y, and return a result. The test double 204A may include a simple test stub or dummy function that accepts x and y and returns a particular value, such as 1, without performing any computations. The test double 204B may include a smart test stub that approximates the callee function 202, e.g., by accepting x and y, performing a relatively simple computation, such as x+y, that approximates but is simpler than the complex computation of the callee function 202, and returning the result of the relatively simple computation to the function under test 200.

Figure 3:
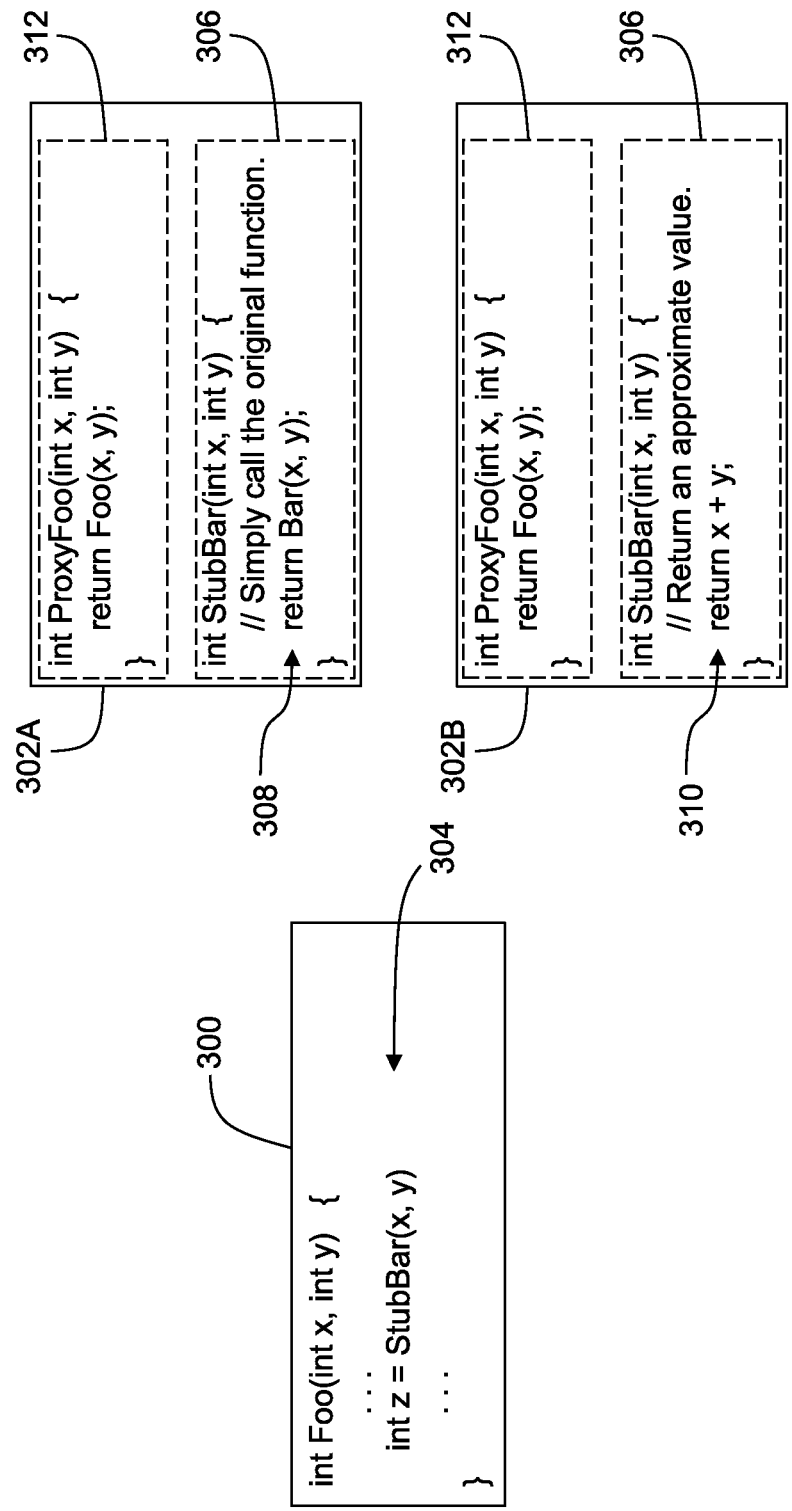
FIG. 3 illustrates an example function under test and example proxy files.

FIG. 3 illustrates an example function under test 300 and example proxy files 302A and 302B (collectively "proxy files 302"), arranged in accordance with at least one embodiment described herein. The function under test 300 is similar to the function under test 200 of FIG. 2, except that the call to the callee function 202, where the callee function is Bar( ) in the function under test 200 is replaced in the function under test 300 of FIG. 3 at line 304 with a call to a test double proxy 306, or StubBar( ), included in each of the proxy files 302.

In the proxy file 302A, the StubBar( ) test double proxy 306 includes an original-behavior test stub 308. An original-behavior test stub may include a test stub that calls the corresponding callee function. Accordingly, the original-behavior test stub 308 simply calls the callee function Bar( ), e.g., with the statement "return Bar(x, y)."

In the proxy file 302B, the StubBar( ) test double proxy 306 includes a smart test stub 310. The smart test stub 310 approximates the callee function Bar( ) while being relatively more simple than the callee function Bar( ).

Both proxy files 302 additionally include a test proxy 312 of the function under test 300. Other proxy files 302 may alternately or additionally be generated that include other test stubs.

During testing, the test proxy 312 calls the function under test 300 and the function under test 300 calls the StubBar( ) test double proxy 306 that includes either the original-behavior test stub 308, the smart test stub 310, or some other test stub. Packaging a test proxy, such as the test proxy 312, together with one or more test double proxies, such as the StubBar( ) test double proxy 306, e.g., in a proxy file such as the proxy files 302, may allow centralized control over behavior of the test double proxies corresponding to the callee functions of the function under test. For example, the test stub for one or more of the test double proxies may be refined to be a different type of test stub, as desired, without modifying the original source code.

Figure 4:
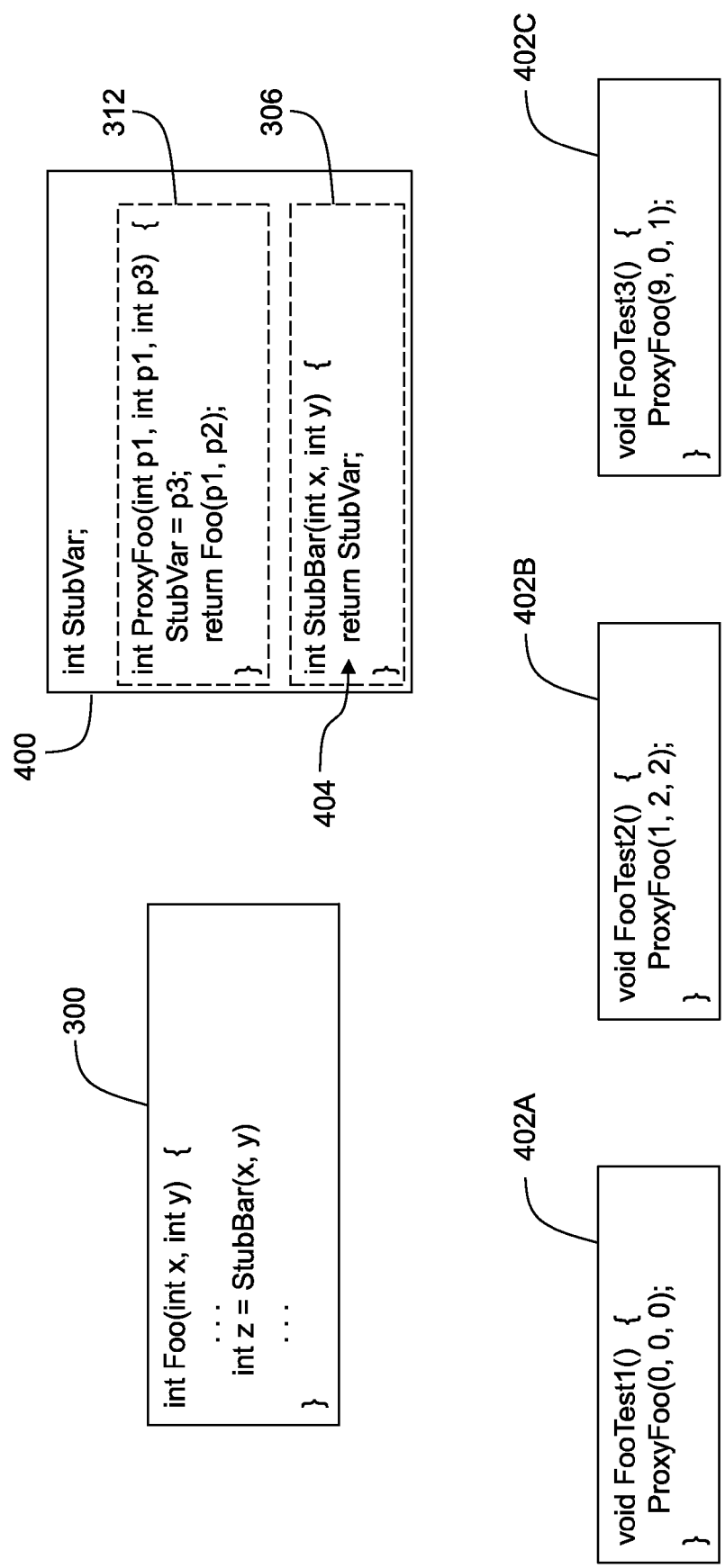
FIG. 4 illustrates the example function under test of FIG. 3, another example proxy file, and example test cases.

FIG. 4 illustrates the example function under test 300, another example proxy file 400, and example test cases 402A-402C (collectively "test cases 402"), arranged in accordance with at least one embodiment described herein. The proxy file 400 includes the test proxy 312 and the StubBar( ) test double proxy 306.

The StubBar( ) test double proxy 306 may include an abstract test stub 404. An abstract test stub for a callee function that returns a variable, such as the Bar( ) callee function, may include a parameterized test stub that returns a variable, e.g., StubVar, that is assigned as a symbolic variable, e.g., p3. Alternately or additionally, an abstract test stub for a callee function that does not return a variable may include a test stub that does nothing, examples of which are illustrated and described below.

The abstract test stub 404 may be parameterized by creating a new variable, StubVar, in the proxy file 400 that is returned when the StubBar( ) test double proxy 306 is called and by assigning StubVar as a symbolic variable, p3, in the test proxy 312. In this and other embodiments, the test proxy 312 may be parameterized by using symbolic variables p1 and p2 in place of x and y and accepting as arguments for the test proxy 312 the symbolic variables p1, p2, and p3.

During testing, the test proxy 312 of FIG. 4 calls the function under test 300 and the function under test 300 calls the StubBar( ) test double proxy 306 that includes the abstract test stub 404. The abstract test stub 404 then returns StubVar, which is assigned as the symbolic variable p3 in the test proxy 312.

Particular combinations of values for p1, p2, and p3 can be tested with the test cases 402. In particular, each of the test cases 402 may call the test proxy 312, passing in a particular value for each of the symbolic variables p1, p2, and p3. For example, the test case 402A may pass the test proxy 312 values of 0, 0, and 0 for p1, p2, and p3, while the test case 402B may pass the test proxy 312 values of 1, 2, and 2 for p1, p2, and p3, and the test case 402C may pass the test proxy 312 values of 9, 0, and 1. Any desired number of test cases 402 may be created to test any desired number of combinations of values for p1, p2, and p3.

Figure 5:
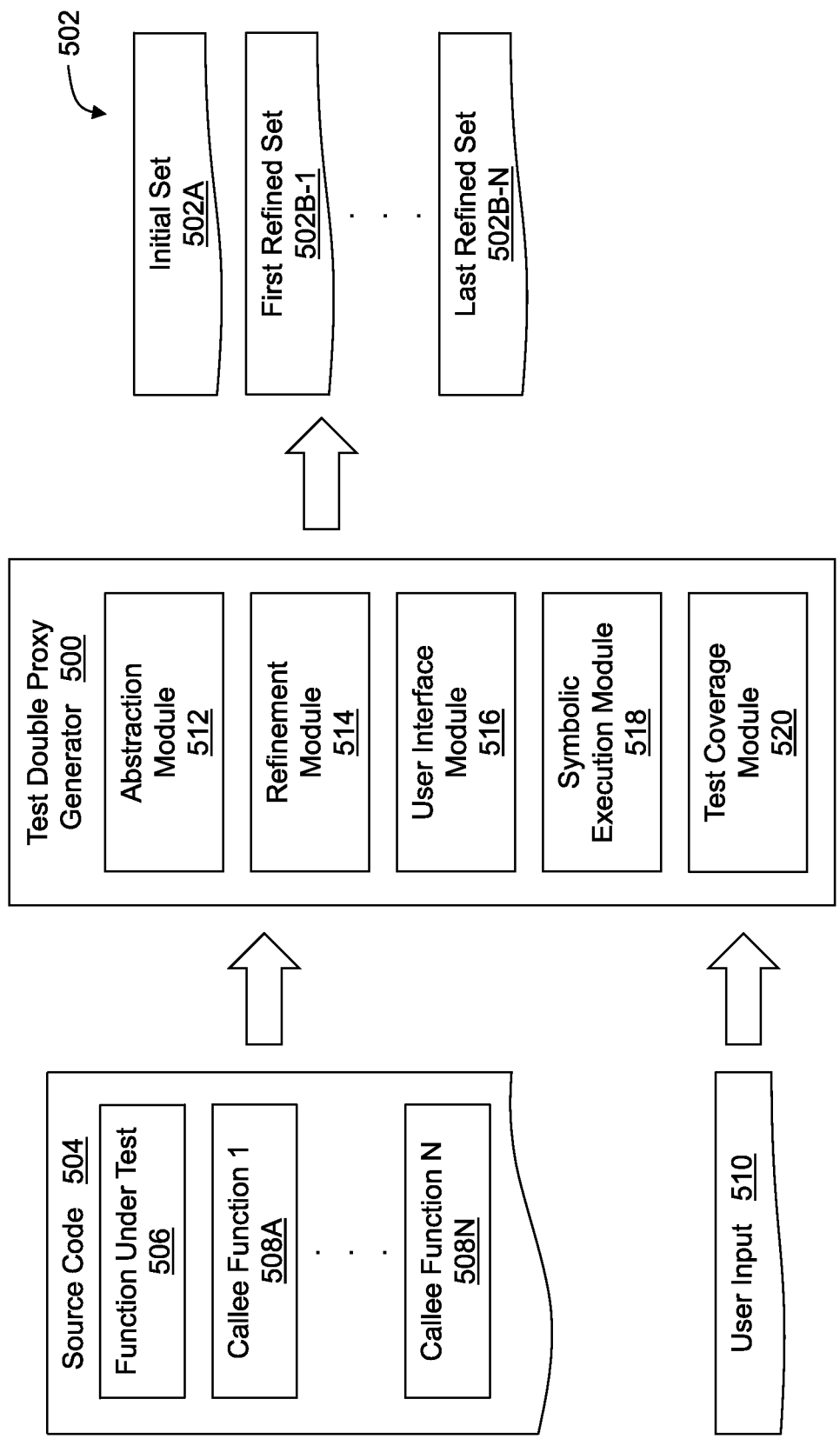
FIG. 5 is a block diagram of an example test double proxy generator configured to create one or more sets of test double proxies.

FIG. 5 is a block diagram of an example test double proxy generator 500 configured to create one or more sets 502 of test double proxies, arranged in accordance with at least one embodiment described herein. At least one of the sets 502 may be packaged with a test proxy in a proxy file. The test double proxy generator 500 may be configured to generate the test double proxies 502 based on source code 504 that includes a function under test 506 and one or more callee functions 508A-508N (collectively "callee functions 508"), and based on user input 510.

The function under test 506 may correspond to or include the function under test 108 or 300 of FIGS. 1, 3 and 4. Each of the callee functions 508 may correspond to or include the callee functions 110 or 306 of FIGS. 1, 3 and 4.

Each of the sets 502 may include one or more test double proxies, including one for each of the callee functions. For instance, each of the sets 502 may include a first test double proxy corresponding to the first callee function 508A, a second test double proxy corresponding to a second one of the callee functions 508, and so on, including a last test double proxy corresponding to the last callee function 508N.

The sets 502 may include an initial set 502A of test double proxies with abstract test stubs for the callee functions 508. The test double proxies 502 may additionally include one or more refined sets 502B-1 to 502B-N (collectively "refined sets 502B") generated in sequence by refinement of at least one abstract test stub in a preceding one of the sets 502. For example, a first refined set 502B-1 may be generated by refinement of at least one abstract test stub in the test double proxies of the initial set 502A, a second refined set (not shown) may be generated by refinement of at least one abstract test stub in the immediately preceding first refined set 502B-1, and so on, while a last refined set 502B-N may be generated by refinement of at least one abstract test stub in an immediately preceding second-to-last refined set (not shown).

The last refined set 502B-N may include the most refinements out of all of the sets 502 and may be included in a proxy file, such as the proxy file 400 of FIG. 4, packaged together with a test proxy, such as the test proxy 312 of FIG. 4. Alternately or additionally, any of the other sets 502 may be included in the proxy file. The refinements may include automatic refinement, based on symbolic execution, of an abstract test stub to an original-behavior test stub, such as the original-behavior test stub 308 of FIG. 3, and/or manual refinement of an abstract test stub to a user-specified test stub that may include a smart test stub, such as the smart test stub 310 of FIG. 3.

The test double proxy generator 500 may include an abstraction module 512, a refinement module 514, a user interface module 516, a symbolic execution module 518, and a test coverage module 520. The test double proxy generator 500 and/or one or more of the modules 512, 514, 516, 518, and 520 may be implemented in hardware, software, or a combination thereof. For instance, the test double proxy generator 500 and/or one or more of the modules 512, 514, 516, 518, and 520 may be implemented in one or more application-specific integrated circuits (ASICs) and/or one or more field-programmable gate arrays (FPGAs) configured to perform the functions and operations described herein.

Alternately or additionally, the test double proxy generator 500 including the modules 512, 514, 516, 518, and 520 may include computer instructions executable by a processor to perform the functions and operations described herein. The computer instructions may be stored in a non-transitory computer-readable medium, examples of which are described in more detail below. Embodiments described herein may include an apparatus such as a computer that includes a processor and a non-transitory computer-readable medium such as a memory communicatively coupled to the processor. The non-transitory computer-readable medium may include stored thereon the test double proxy generator 500 and/or one or more of the modules 512, 514, 516, 518, and 520 that are executable by the processor to perform the functions and operations described herein. The modules 512, 514, 516, 518, and 520 will now be described.

The abstraction module 512 may be configured to generate the initial set 502A of test double proxies with abstract test stubs for all of the callee functions 508 called by the function under test 506. Each test double proxy included in the initial set 502A may include a different one of the abstract test stubs and may correspond to a different one of the callee functions 508. For each of the callee functions 508, the abstraction module 512 may be configured to generate the initial set 502A with abstract test stubs for all of the callee functions 508 by, for each of the callee functions 508, generating a test stub that does nothing if the corresponding one of the callee functions 508 does not return a variable, or by generating a parameterized test stub that returns a variable assigned as a symbolic variable if a corresponding one of the callee functions 508 returns a variable.

The refinement module 514 may be configured to generate, e.g., in sequence, the refined sets 502B by refining at least one abstract test stub of a test double proxy in an immediately preceding set of test double proxies 502. For example, in the first refined set 502B-1, at least a first one of the abstract test stubs included in a first test double proxy of the initial set 502A may be refined to, e.g., replaced with, a refined test stub, while potentially other abstract test stubs included in other test double proxies of the initial set 502A remain in the first refined set 502B-1. The refinement module 514 may generate each refined set 502B-1 to 502B-N in response to a corresponding determination that refining at least one abstract test stub in an immediately preceding set 502 improves a test coverage of the function under test 506.

The user interface module 516 may be configured to receive the user input 510. The user input 510 may be effective to refine at least one abstract test stub of a test double proxy in each of the refined sets 502B to a user-specified test stub. For example, after the test double proxy generator 500 outputs the first refined set 502B-1, a user may refine at least one of the abstract test stubs that remain therein. Alternately or additionally, if a user decides not to refine at least one of the abstract test stubs that remain therein, the most recently generated refined set 502B may be packaged with a test proxy in a proxy file for the function under test 506.

The refinement module 514 and/or the user interface module 516 may be configured to iteratively improve the test double proxies of the callee functions 508, including being configured as follows for each of one or more iterations. The refinement module 514 may be configured to automatically generate a current refined set 502B by refining, in an immediately preceding set 502, at least one of the abstract test stubs to a refined test stub based on symbolic execution of the function under test 506. Additionally, the user interface module 516 may be configured to receive the user input 510 effective to refine at least one of the abstract test stubs to a user-specified test stub in the current refined set 502B. In a first iteration of the iterative process, the immediately preceding set 502 may include the initial set 502A and the current refined set 502B may include the first refined set 502B-1. More generally, the current refined set 502B may include the refined set 502B generated in a current iteration of the iterative process. The current refined set 502B with the user specified test stub in the current iteration may then become the immediately preceding set 502 in an immediately subsequent iteration.

The symbolic execution module 518 may be configured to symbolically execute the function under test 506 using the initial set 502A of test double proxies with all abstract test stubs prior to generation of the first refined set 502B-1. The test coverage module 520 may be configured to determine the test coverage of the function under test 506 provided by the initial set 502A of test double proxies with all abstract test stubs prior to generation of the first refined set 502B-1. In these and other embodiments, the refinement module 514 may be further configured to temporarily refine, prior to generation of the first refined set 502B-1, a subset of the abstract test stubs, including being configured to temporarily refine at least one of the abstract test stubs to the refined test stub, where the refined subset of the abstract test stubs includes the refined test stub. The symbolic execution module 518 may be further configured to symbolically execute, prior to generation of the first refined set 502B-1, the function under test 506 using both a first subset of the initial set 502A of test double proxies that includes the temporarily-refined subset of the abstract test stubs and a remainder of the initial set 502A of test double proxies. The test coverage module 520 may be further configured to determine, prior to generation of the first refined set 502B-1, that the test coverage of the function under test provided by the first subset of the initial set 502A of test double proxies with the temporarily-refined subset of the abstract test stubs and the remainder of the initial set 502A of test double proxies is improved compared to the test coverage provided by the initial set 502A of test double proxies with all abstract test stubs. The refinement module 514 may be further configured to include the temporarily-refined subset of the abstract test stubs as a permanent refinement in the first refined set 502B-1 in response to determining that the test coverage is improved.

The test coverage module 520 may determine the test coverage of the function under test 506 provided by the initial set 502A of test double proxies with all abstract test stubs by determining which branches of the function under test 506 may not be taken during symbolic execution of the function under test 506 using the initial set 502A of test double proxies with all abstract test stubs. The test coverage module 520 may be configured to determine that a refinement results in improved test coverage if the refinement allows more branches of the function under test 506 to be taken during symbolic execution of the function under test 506 using the refinement.

The refinement module 514, the user interface module 516, the symbolic execution module 518, and/or the test coverage module 520 may be further configured to iteratively refine a current set 502 of the test double proxies prior to generating an immediately subsequent refined set 502B of test double proxies as follows. In these and other embodiments, the current set 502 may include the initial set 502A or a refined set 502B that precedes the immediately subsequent refined set 502B.

In more detail, the refinement module 514 may be configured to determine, prior to the generation of the immediately subsequent refined set 502B, whether all subsets of the abstract test stubs in the current set 502 have been refined, and to generate the immediately subsequent refined set 502B in response to determining that all subsets of the abstract test stubs have been refined in the current set 502. In response to determining that all subsets of the abstract test stubs have not been refined in the current set 502, the refinement module 514 may be further configured to temporarily refine a current subset of the abstract test stubs in the current set 502 that has not been refined. The symbolic execution module 518 may be further configured to symbolically execute, prior to the generation of the immediately subsequent refined set 502B, the function under test 506 using both a current subset of the current set 502 with the temporarily refined current subset of the abstract test stubs and a current remainder of the current set 502. The current remainder of the current set 502 may include all of the current set 502 excluding the current subset of the current set 502. In response to symbolic execution of the function under test 506 using both the current subset of the current set 502 and the remainder of the current set 502 timing out, or in response to symbolic execution of the function under test 506 using both the current subset of the current set 502 and the remainder of the current set 502 both not timing out and not improving a previous test coverage of the function under test 506, the refinement module 514 may be further configured to unrefine, prior to the generation of the immediately subsequent refined set 502B, the temporarily refined current subset of the abstract test stubs. In response to symbolic execution of the function under test 506 using both the current subset of the current set 502 and the remainder of the current set 502 both not timing out and improving the previous test coverage of the function under test 506, the refinement module 514 may be further configured to include the temporarily refined current subset of the abstract test stubs as a permanent refinement in the immediately subsequent refined set 502B.

Figure 6A:
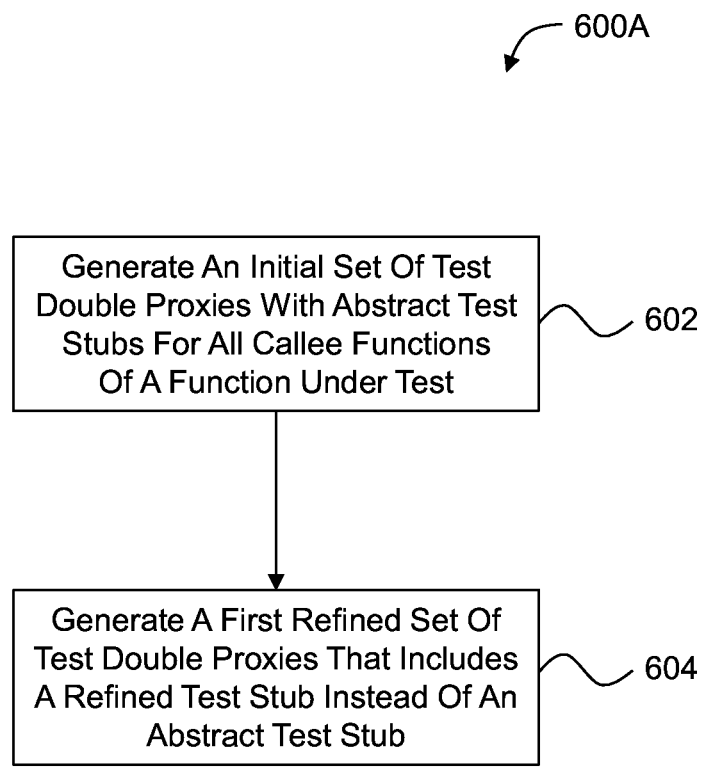
FIG. 6A is a flowchart of an example method to generate test double proxies for callee functions of a function under test.

FIG. 6A is a flowchart of an example method 600A to generate test double proxies for callee functions of a function under test, arranged in accordance with at least one embodiment described herein. The method 600A may be implemented, in some embodiments, by a computer or other apparatus, such as a computer executing the test double proxy generator 500 of FIG. 5. Although illustrated as discrete blocks, various blocks may be divided into additional blocks, combined into fewer blocks, or eliminated, depending on the desired implementation.

The method 600A may begin at block 602 in which an initial set of test double proxies with abstract test stubs for all callee functions called by a function under test is generated. Each of the test double proxies in the initial set of test double proxies may correspond to a different one of the callee functions. Generating the initial set of test double proxies with the abstract test stubs for all the callee functions may include, for each of the callee functions, generating a test stub that does nothing if the corresponding one of the callee functions does not return a variable, or generating a parameterized test stub that returns a symbolic variable if a corresponding one of the callee functions returns a variable.

At block 604, a first refined set of test double proxies may be generated. The refined set of test double proxies may include a first refined test stub instead of a first one of the abstract test stubs for a first test double proxy in the initial set of test double proxies. The first refined set of test double proxies may be generated in response to determining that refining the first one of the abstract test stubs improves a test coverage of the function under test.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600A may include receiving user input effective to refine a second one of the abstract test stubs in the first refined set of test double proxies to a user-specified test stub. The method 600A may alternately or additionally include iteratively improving the test double proxies, including, in each of one or more iterations, automatically generating a current refined set of test double proxies by refining, in an immediately preceding set of test double proxies, at least one of the abstract test stubs to a refined test stub based on symbolic execution of the function under test; and receiving user input effective to refine at least one of the abstract test stubs to a user-specified test stub in the current refined set of test double proxies. Refining at least one of the abstract test stubs to a refined test stub may include replacing the at least one of the abstract test stubs that is refined to the refined test stub with a call to a corresponding one of the callee functions; such a refined test stub may also be referred to as an original-behavior test stub. Alternately or additionally, receiving user input effective to refine at least one of the abstract test stubs to a user-specified test stub may include receiving user input effective to replace the at least one of the abstract test stubs that is refined to the user-specified test stub with a smart test stub that approximates a corresponding one of the callee functions.

The method 600A may alternatively or additionally include, prior to generating the first refined set of test double proxies, symbolically executing the function under test using the initial set of test double proxies; determining the test coverage of the function under test provided by the initial set of test double proxies; temporarily refining a subset of the abstract test stubs included in the initial set of test double proxies, including temporarily refining the first one of the abstract test stubs in the first test double proxy to the first refined test stub, where the refined subset of the abstract test stubs includes the first refined test stub; symbolically executing the function under test using both a first subset of the initial set of test double proxies with the temporarily-refined subset of the abstract test stubs and a remainder of the initial set of test double proxies; determining that the test coverage of the function under test provided by the first subset of the initial set of test double proxies with the temporarily-refined subset of the abstract test stubs and the remainder of the initial set of test double proxies is improved compared to the test coverage provided by the initial set of test double proxies with all abstract test stubs; and including the temporarily-refined subset of the abstract test stubs as a permanent refinement in the first refined set of test double proxies in response to determining that the test coverage is improved.

More generally, in some embodiments, the method 600A may include iteratively refining a current set of test double proxies prior to generating an immediately subsequent refined set of test double proxies. Iteratively refining the current set of test double proxies prior to generating the immediately subsequent refined set of test double proxies may include determining whether all subsets of the abstract test stubs have been refined in the current set of test double proxies; in response to determining that all subsets of the abstract test stubs in the current set of test double proxies have been refined, generating the immediately subsequent refined set of test double proxies; in response to determining that all subsets of the abstract test stubs in the current set of test double proxies have not been refined, temporarily refining a current subset of the abstract test stubs in the current set of test double proxies that has not been refined; symbolically executing the function under test using both a current subset of the current set of test double proxies with the temporarily refined current subset of the abstract test stubs and a current remainder of the current set of test double proxies; in response to symbolic execution of the function under test using both the current subset of the current set of test double proxies and the remainder of the current set of test double proxies timing out, or in response to symbolic execution of the function under test using both the current subset of the current set of test double proxies and the remainder of the current set of test double proxies both not timing out and not improving a previous test coverage of the function under test, unrefining the temporarily refined current subset of the abstract test stubs (e.g., undoing the temporary refinement); and in response to symbolic execution of the function under test using both the current subset of the current set of test double proxies and the remainder of the current set of test double proxies both not timing out and improving the previous test coverage of the function under test, including the temporarily refined current subset of the abstract test stubs as a permanent refinement in the immediately subsequent refined set of test double proxies.

Figure 6B:
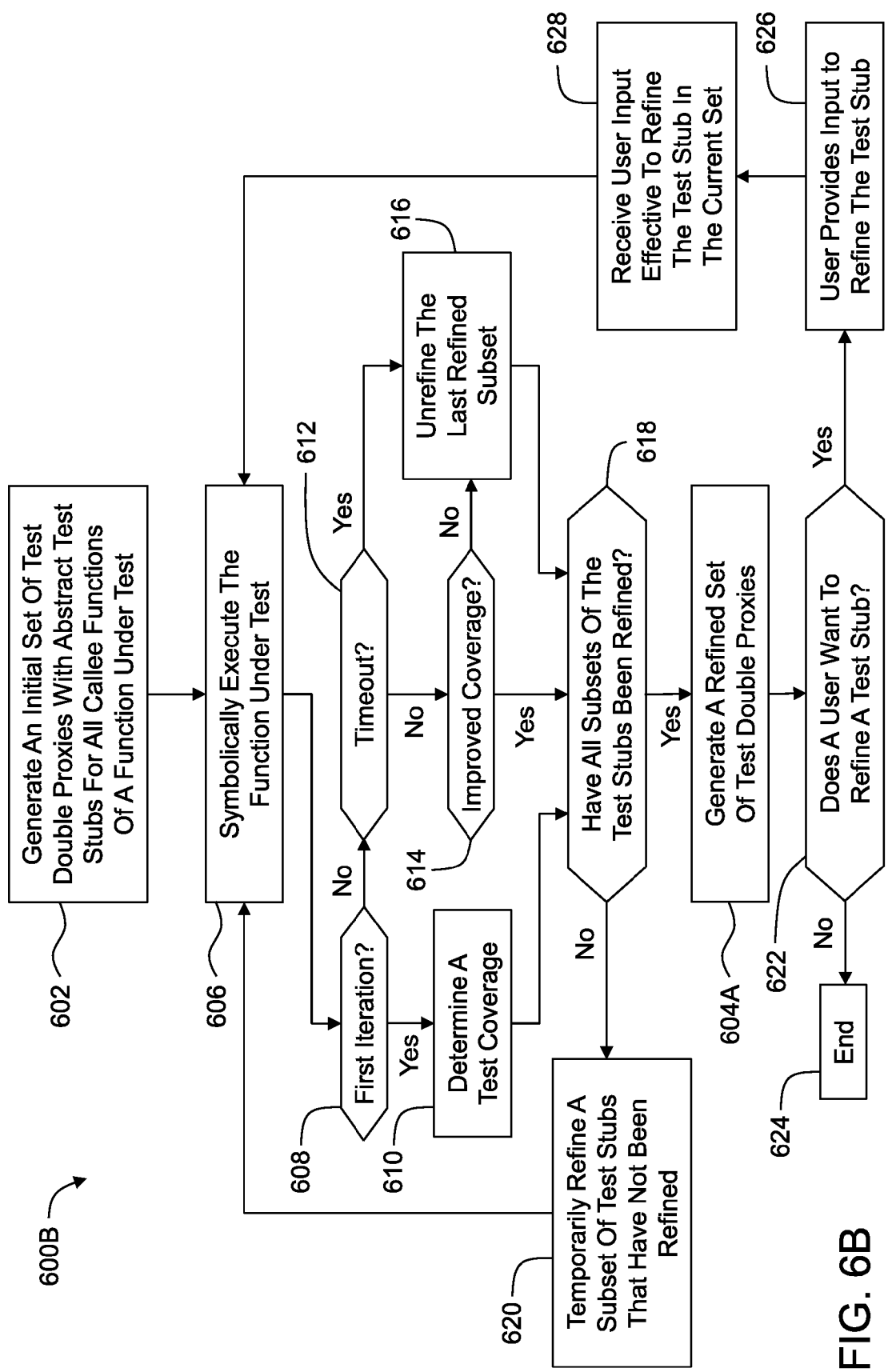
FIG. 6B is a flowchart of another example method to generate test double proxies for callee functions of a function under test.

Alternately or additionally, the method 600A may include additional steps or operations as described in more detail with respect to FIG. 6B.

FIG. 6B is a flowchart of another example method 600B to generate test double proxies for callee functions of a function under test, arranged in accordance with at least one embodiment described herein. The method 600B may be implemented, in some embodiments, by a computer or other apparatus, such as a computer executing the test double proxy generator 500 of FIG. 5. Although illustrated as discrete blocks, various blocks may be divided into additional blocks, combined into fewer blocks, or eliminated, depending on the desired implementation.

The method 600B may include one or more blocks 602, 604A, 606, 608, 610, 612, 614, 616, 618, 620, 622, 624, 626, and/or 628 that may overlap with the method 600A of FIG. 6A or its variants described above. For example, the method 600B of FIG. 6B may include block 602 that is the same as block 602 of FIG. 6A and block 604A that broadly includes block 604 of FIG. 6A. A combination of at least some of blocks 604A through 628 in the method 600B of FIG. 6B may be effective to iteratively improve the test double proxies and/or to iteratively refine the current set of test double proxies prior to generating the immediately subsequent refined set of test double proxies, as briefly described in the context of FIG. 6A, and as described in more detail below. The method 600B of FIG. 6B will now be described.

After generating the initial set of test double proxies with abstract test stubs for all callee functions of the function under test (block 602), the method 600B may additionally include, at block 606, symbolically executing the function under test using the initial set of test double proxies with all abstract test stubs. More generally, block 606 may include symbolically executing the function under test using a current set of test double proxies. The current set of test double proxies may include the initial set of test double proxies with all abstract test stubs if coming from block 602, at least one temporarily refined test stub if coming from block 620, and/or at least one user-specified test stub if coming from block 628.

Blocks 606-620 may be effective to iteratively refine a current set of test double proxies prior to generating an immediately subsequent set of test double proxies. In general, each iteration of blocks 606-620 may involve refining a subset of the test stubs and symbolically executing the function under test to determine whether the refinement causes symbolic execution to time out and/or improves a test coverage of the function under test. Blocks 606-620, when combined with blocks 604A, 622, 624, and/or 628, may be effective to iteratively improve the test double proxies. In general, each iteration of blocks 606-620 combined with blocks 604A, 622, 624, and/or 628 may involve automatically generating a refined set of test doubles proxies (blocks 606-620 and 604A) and manually refining at least one of the test double proxies in the refined set (blocks 622, 626, and/or 628)

Accordingly, and at block 608, it may be determined whether blocks 606-620 are on a first iteration using the initial set of test double proxies, or more generally, on a first iteration using the current set of test double proxies. It may be determined that blocks 606-620 are on a first iteration using the current set of test double proxies if the method 600B has just come from block 602 or from block 628. Block 608 may be followed by block 610 ("Yes" at block 608) or block 612 ("No" at block 608).

At block 610, a test coverage of the function under test provided by the current set of test double proxies may be determined. Block 610 may be followed by block 618.

At block 618, it may be determined whether all subsets of the abstract test stubs in the current set of test proxies have been refined. More particularly, it may be determined whether all subsets of the abstract test stubs in the current set of test proxies have been at least temporarily refined. Each temporary refinement may last at least as long as it takes to perform blocks 606, 612, and/or 614. Each subset of the abstract test stubs may include one or more abstract test stubs. Block 618 may be followed by block 620 ("No" at block 618) or block 604A ("Yes" at block 618).

At block 620, a subset of the abstract test stubs in the current set of test proxies that have not been refined may be temporarily refined. Block 620 may be followed by block 606.

When coming from block 620, block 606 may include symbolically executing the function under test using a current subset of the current set of test double proxies with the temporarily refined current subset of the abstract test stubs and a current remainder of the current set of test double proxies. Each of the test stubs of the test double proxies in the current remainder of the current set of test double proxies may include one or more of an abstract test stub that has not yet been temporarily refined, an abstract test stub that has previously been temporarily refined and then unrefined (e.g., at block 616), a refined test stub that has previously been temporarily refined and then kept as a permanent refinement, and a user-specified test stub (discussed with respect to blocks 626 and 628). Block 606 may then be followed by block 608, where it may be determined that blocks 606-620 are not on a first iteration, such that block 608 may be followed by block 612.

At block 612, it may be determined whether symbolic execution of the function under test using the current subset of the current set of test double proxies with the temporarily refined current subset of the abstract test stubs and the current remainder of the current set of test double proxies times out. Block 612 may be followed by block 614 ("No" at block 612) or block 616 ("Yes" at block 612).

At block 614, it may be determined whether symbolic execution of the function under test using the current subset of the current set of test double proxies with the temporarily refined current subset of the abstract test stubs and the current remainder of the current set of test double proxies improves the test coverage of the function under test. Block 614 may be followed by block 616 ("No" at block 614) or block 618 ("Yes" at block 614).

At block 616, the temporarily refined current subset of the abstract test stubs may be unrefined if symbolic execution of the function under test using the current subset of the current set of test double proxies with the temporarily refined current subset of the abstract test stubs and the current remainder of the current set of test double proxies times out or does not improve the test coverage. Unrefining the temporarily refined current subset of the abstract test stubs may include undoing the temporary refinement, e.g., changing the temporarily refined current subset of the abstract test stubs back to abstract test stubs.

On the other hand, if symbolic execution of the function under test using the current subset of the current set of test double proxies with the temporarily refined current subset of the abstract test stubs and the current remainder of the current set of test double proxies does not time out and improves the test coverage, the temporarily refined current subset of the abstract test stubs may be maintained as permanent refinements as blocks 606-620 iterate and may be included as permanent refinements in the refined set of test double proxies generated at block 604A. Blocks 606-620 may repeat until all subsets of the abstract test stubs in the current set of test double proxies have been at least temporarily refined.

At block 604A, a refined set of test double proxies may be generated. The refined set of test double proxies may include one or more refined test stubs included as permanent refinements and/or one or more unrefined abstract test stubs as determined by iterating blocks 606-620 with the immediately preceding set of test double proxies. Block 604A may be followed by block 622.

At block 622, it may be determined whether the user wants to refine a test stub in the refined set of test double proxies. For instance, the user may desire to refine one of the abstract test stubs, and/or one of the refined test stubs. Block 622 may be followed by block 624 ("No" at block 622) or block 626 ("Yes" at block 622).

At block 624, the method 600B may end if the user does not want to refine any of the test stubs in the current set, e.g., the refined set, of test double proxies. The current set of test double proxies may then be packaged with a test proxy, e.g., in a proxy file such as the proxy file 400 of FIG. 4.

At block 626, the user may provide input effective to refine the desired test stub. Block 626 may be followed by block 628.

At block 628, user input effective to refine the test stub in the current set of test double proxies may be received. For instance, the user may provide user input effective to change an abstract test stub to a user-specified test stub such as a smart test stub. Block 628 may be followed by block 606.

Blocks 606-620 may then iterate again, this time with the current set of test double proxies that may include at least one automatically refined test stub, e.g., at least one permanent refinement determined by the iterations of blocks 606-620 with the immediately preceding set of test double proxies, and at least one user-specified test stub received at blocks 628.

Some embodiments described herein may include a non-transitory computer-readable medium that has computer instructions stored thereon that are executable by a processor to perform one or more of the operations of FIG. 6A and/or FIG. 6B. The test double proxy generator 500 and/or its modules 512, 514, 516, 518, and 520 is an example of such computer instructions.

FIGS. 7A-7E illustrate example source code 700 that includes a function under test Foo( ) with calls to callee functions printf( ), Bar( ) and Baz( ) arranged in accordance with at least one embodiment described herein. FIGS. 7A-7E additionally illustrate proxy files 702A-702E (collectively "proxy files 702") that each include a test proxy 704 of the function under test Foo( ) and test double proxies 706, 708, and 710 for the callee functions printf( ), Bar( ) and Baz( ).

The test proxy 704 may be parameterized by using symbolic variables p1 and p2 in place of x and y and accepting as arguments for the test proxy 704 the symbolic variables p1 and p2.

The set of test double proxies 706, 708, and 710 included in the proxy files 702 may be generated according to the method 600A of FIG. 6A and/or the method 600B of FIG. 6B.

Although not illustrated in FIGS. 7A-7E, in some embodiments, calls to the callee functions printf( ), Bar( ), and Baz( ) may be replaced in the function under test Foo( ) with calls to the test double proxies 706, 708, 710 without modifying the source code 700 using, e.g., code preprocessor macros, a modified compiler and linker, and/or a runtime implementation modification as previously mentioned. Alternately, the source code 700 itself may be modified by replacing calls to the callee functions printf( ), Bar( ), and Baz( ) with calls to the test double proxies 706, 708, 710 within the source code 700.

As illustrated in FIGS. 7A-7E, the function under test Foo( ) may accept two arguments, integers x and y. Line 712 of the source code 700 includes a call to the callee function printf( ). Line 714 of the source code 700 includes a conditional statement that calls the callee function Bar( ) and passes y into the callee function Bar( ). If the conditional statement at line 714 evaluates true, a true branch at line 715 of the source code 700 may be followed. If the conditional statement at line 714 evaluates false, a false branch at line 716 of the source code 700 may be followed. Line 716 includes a call to the callee function Baz( ) and passes x into the callee function Baz( ). As represented at 718, the callee function Bar( ) may be a complex function. Line 720 may declare a global variable (hereinafter "global") initially assigned a value of zero, which may be subsequently assigned to the value passed in to the callee function Baz( ), as indicated at 722.

Each of FIGS. 7A-7E will now be described with additional reference to FIG. 6B.

Figure 7A:
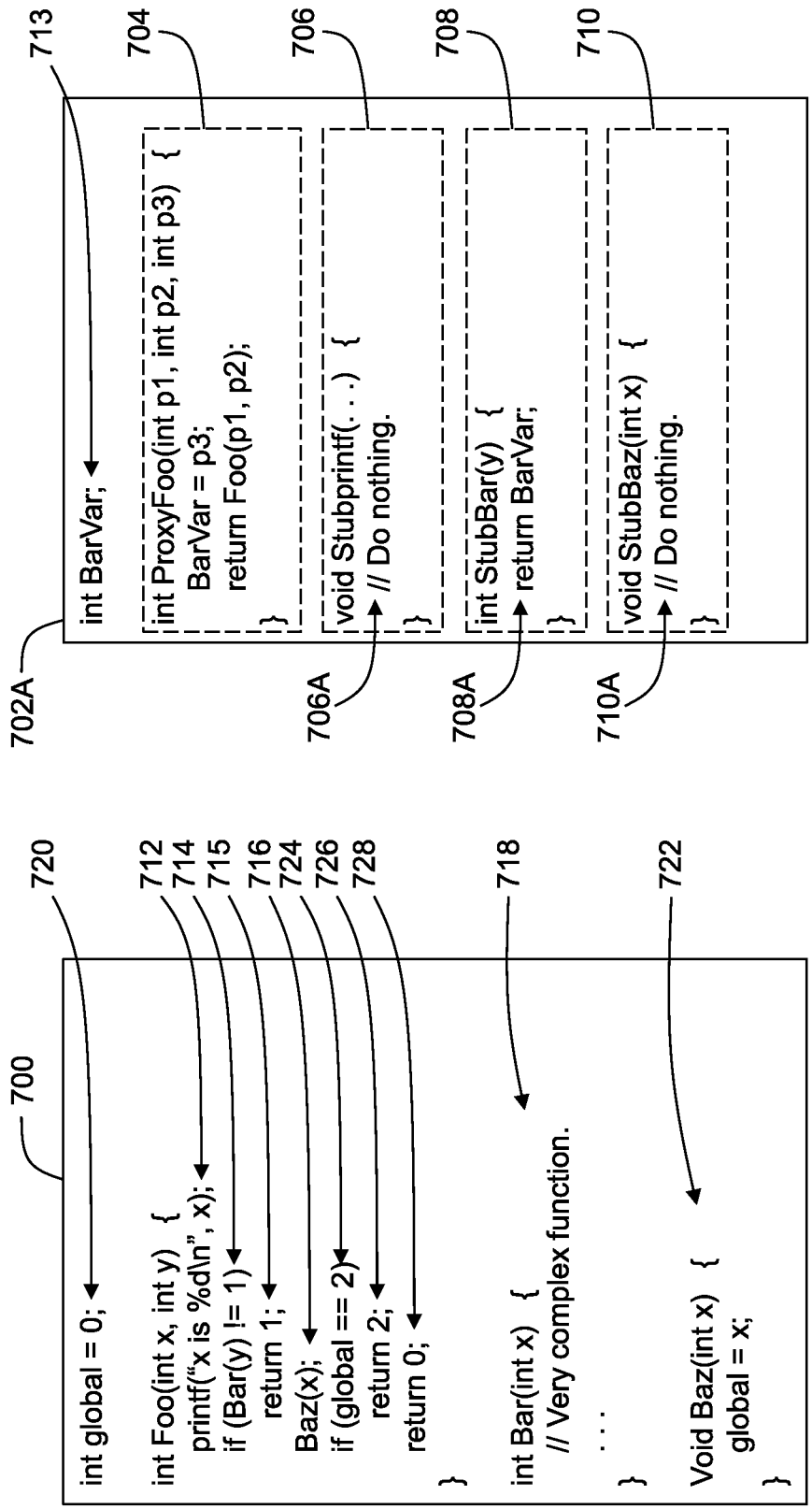
FIGS. 7A-7E illustrate example source code that includes a function under test with calls to callee functions.

The proxy file 702A of FIG. 7A may include an initial set of test double proxies 706, 708, 710 with abstract test stubs for all of the callee functions printf( ), Bar( ), and Baz( ) that may be generated at block 602.

Neither one of the callee functions printf( ) or Baz( ) returns a variable. As such, generating the initial set of test double proxies 706, 708, 710 with abstract test stubs may include, for the callee functions printf( ) and Baz( ) generating a test stub 706A or 710A that does nothing. Accordingly, neither of the test stubs 706A or 710A returns a variable, makes any assignments, or does anything else.

Although not illustrated in FIGS. 7A-7E, the callee function Bar( ) may return a variable. As such, generating the initial set of test double proxies 706, 708, 710 with abstract test stubs may include, for the callee function Bar( ), generating a parameterized test stub 708A that returns a variable BarVar. Generating the abstract test stub 708A as a parameterized test stub may include declaring or otherwise creating a new variable, e.g., the variable BarVar, at line 713 of the proxy file 702A, including a statement to return the variable BarVar when the test double proxy 708 is called in the parameterized test stub 708A, and by assigning the variable BarVar as a symbolic variable, p3, in the test proxy 704. The test proxy 704 may be further parameterized by accepting the symbolic variable p3 as one of its arguments. Block 602 may be followed by block 606.

At block 606, the function under test Foo( ) may be symbolically executed using the initial set of test double proxies 706, 708, and 710 with all abstract test stubs 706A, 708A, and 710A. Block 606 may be followed by block 608.

At block 608, it may be determined that blocks 606-620 are on a first iteration with the initial set of test double proxies.

At block 610, a test coverage of the function under test provided by the initial set of test double proxies 706, 708, and 710 with all abstract test stubs 706A, 708A, and 710A may be determined. In the illustrated embodiment, the function under test Foo( ) includes a conditional statement at line 724 that evaluates whether global is equal to 2. If the conditional statement at line 724 evaluates true, a true branch at line 726 of the source code 700 may be followed. If the conditional statement at line 724 evaluates false, a false branch at line 728 of the source code 700 may be followed.

Because global is initially assigned the value zero at line 720 of the source code 700, the conditional statement at line 724 evaluates false such that the false branch at line 728 may be followed but the true branch at line 726 may not be followed. Further, because the abstract test stub 710A of the test double proxy 710 for the callee function Baz( ) does nothing where the callee function Baz( ) would have subsequently assigned global to the value passed in to the callee function Baz( ), test coverage of the function under test Foo( ) using the initial set of test double proxies 706, 708, 710 with all abstract test stubs 706A, 708A, 710A may include all of the function under test Foo( ) except for line 726 of the source code.

More particularly, all of the lines of the function under test Foo( ) except for line 726 may be covered by setting appropriate values to the symbolic variables p1, p2, and p3, e.g., by setting the symbolic variables to values that satisfy path conditions of the function under test Foo( ). For example, lines 712, 714, and 715 may be covered by (p1, p2, p3)=(0, 0, 0) and lines 712, 714, 716, 724, and 728 may be covered by (p1, p2, p3)=(0, 0, 1). However, line 726 may not be covered using the initial set of test double proxies 706, 708, 710 with all abstract test stubs because the value of global may be changed only when the callee function Baz( ) is called, which is not permitted by the test double proxy 710 with the abstract test stub 710A. Block 610 may be followed by block 618.

Figure 7B:
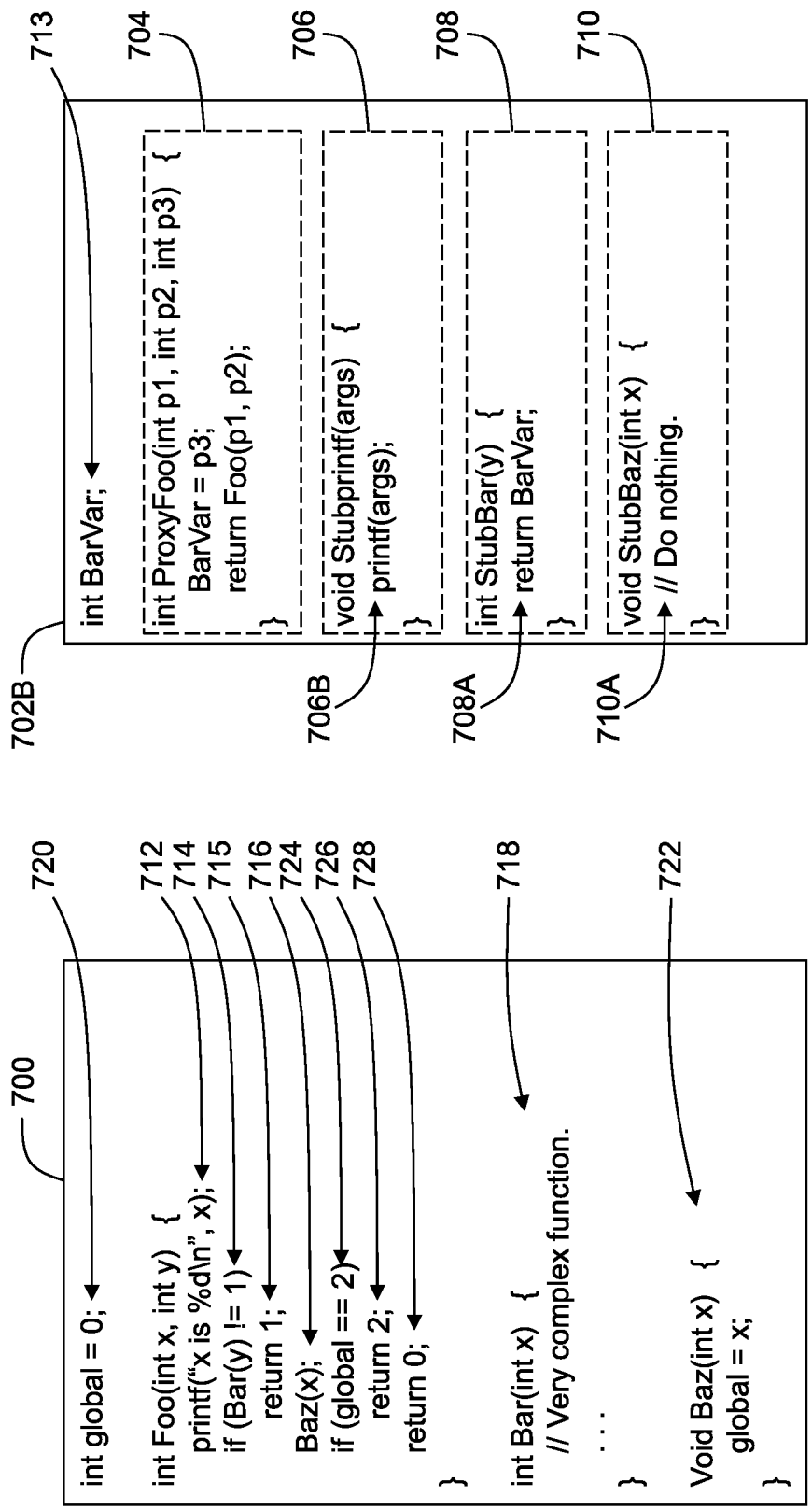

At block 618, it may be determined that not all of the subsets of the test stubs 706, 708, and 710 have been refined, and the method 600B may proceed to block 620 in which, as illustrated in the proxy file 702B of FIG. 7B, a subset including the abstract test stub 706A of the test double proxy 706 may be temporarily refined to an original-behavior test stub 706B. Block 620 may be followed by block 606.

At block 606, the function under test Foo( ) may be symbolically executed using both the original-behavior test stub 706B and the abstract test stubs 708A and 710A in the proxy file 702B. Block 606 may be followed by block 608, and since the method 600B is not on the first iteration using the initial set of test double proxies 706, 708, and 710, the method 600B may proceed to block 612.

The original-behavior test stub 706B may not have a meaningful impact on the time to symbolically execute the function under test Foo( ) using the original-behavior test stub 706B and the abstract test stubs 708A and 710. As such, the symbolic execution may not time out and the method 600B may proceed to block 614.

The test coverage of the function under test Foo( ) provided by the original-behavior test stub 706B and the abstract test stubs 708A and 710A may be determined not to improve test coverage compared to the test coverage provided by all abstract test stubs 706A, 708A, and 710A since the only change provided by the original-behavior test stub 706B may be to print something to a display or monitor. As such, block 614 may be followed by block 616.

At block 616, the original-behavior test stub 706B may be unrefined. Stated another way, the temporary refinement of the abstract test stub 706A to the original-behavior test stub 706B may be undone such that the original-behavior test stub 706B may be changed back to the abstract test stub 706A, as illustrated in the proxy file 702C of FIG. 7C. Block 616 may be followed by block 618.

Figure 7C:
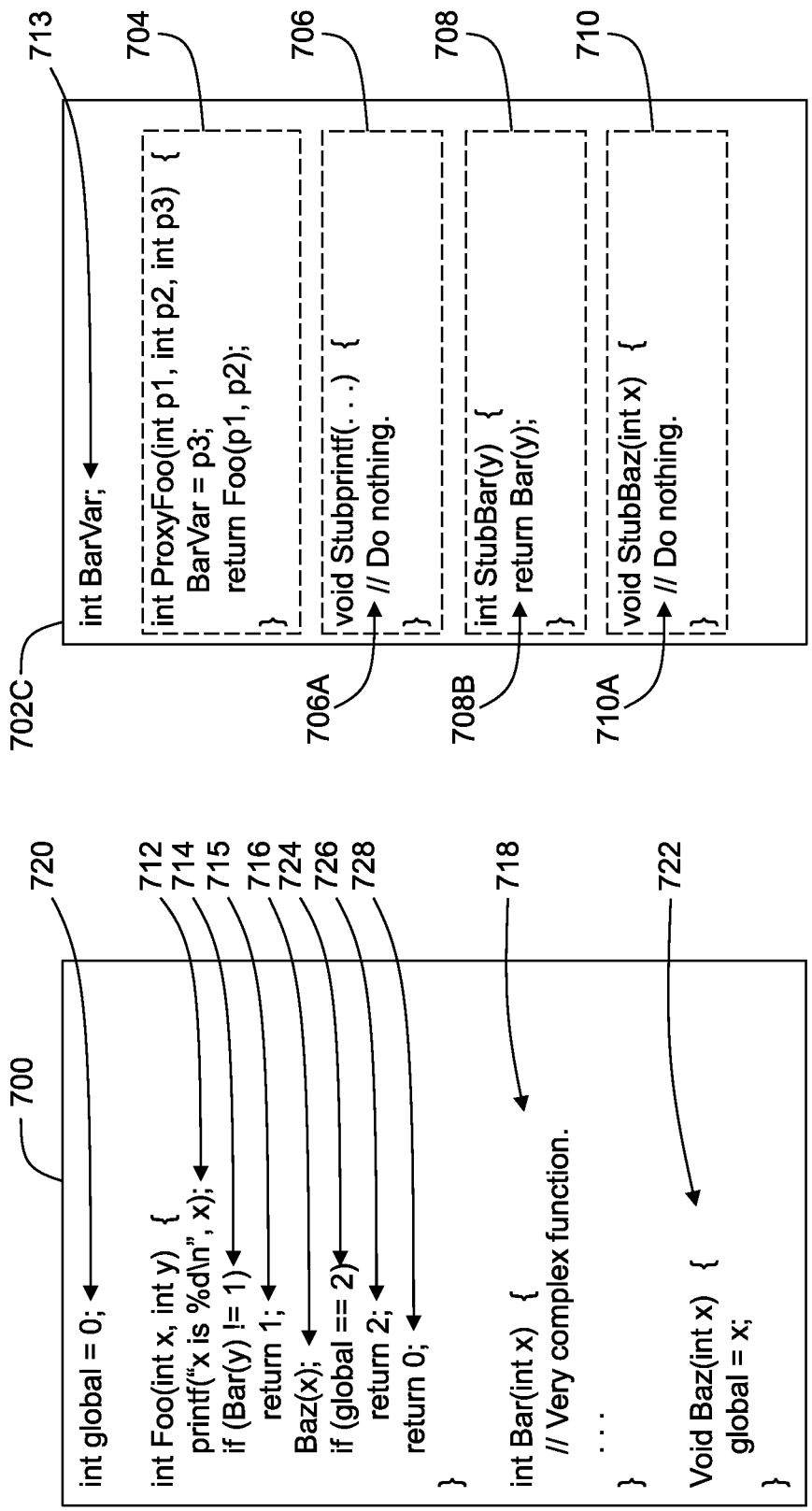

At block 618, it may be determined that not all of the subsets of the test stubs 706, 708, and 710 have been refined, and the method 600B may proceed to block 620 in which, as further illustrated in the proxy file 702C of FIG. 7C, a subset including the abstract test stub 708A of the test double proxy 708 may be temporarily refined to an original-behavior test stub 708B. Block 620 may be followed by block 606.

At block 606, the function under test Foo( ) may be symbolically executed using both the original-behavior test stub 708B and the abstract test stubs 706A and 710A in the proxy file 702C. Block 606 may be followed by block 608, and since the method 600B is not on its first iteration using the initial set of test double proxies 706, 708, and 710, the method 600B may proceed to block 612.

Whereas the callee function Bar( ) may be a relatively complex function, as represented at 718 in the source code 700, the original-behavior test stub 708B that calls the callee function Bar( ) may have a meaningful or measurable impact on the time to symbolically execute the function under test Foo( ) using the original-behavior test stub 708B and the abstract test stubs 706A and 710A. Indeed, the symbolic execution using the original-behavior test stub 708B and the abstract test stubs 706A and 710A may be determined to time out if the execution time exceeds a particular threshold execution time, in which case the method 600B may then proceed to block 616.

Accordingly, at block 616, the original-behavior test stub 708B may be unrefined. Stated another way, the temporary refinement of the abstract test stub 708A to the original-behavior test stub 708B may be undone such that the original-behavior test stub 708B may be changed back to the abstract test stub 786A, as illustrated in the proxy file 702D of FIG. 7D, since symbolic execution timed out at block 612. Block 616 may be followed by block 618.

Figure 7D:
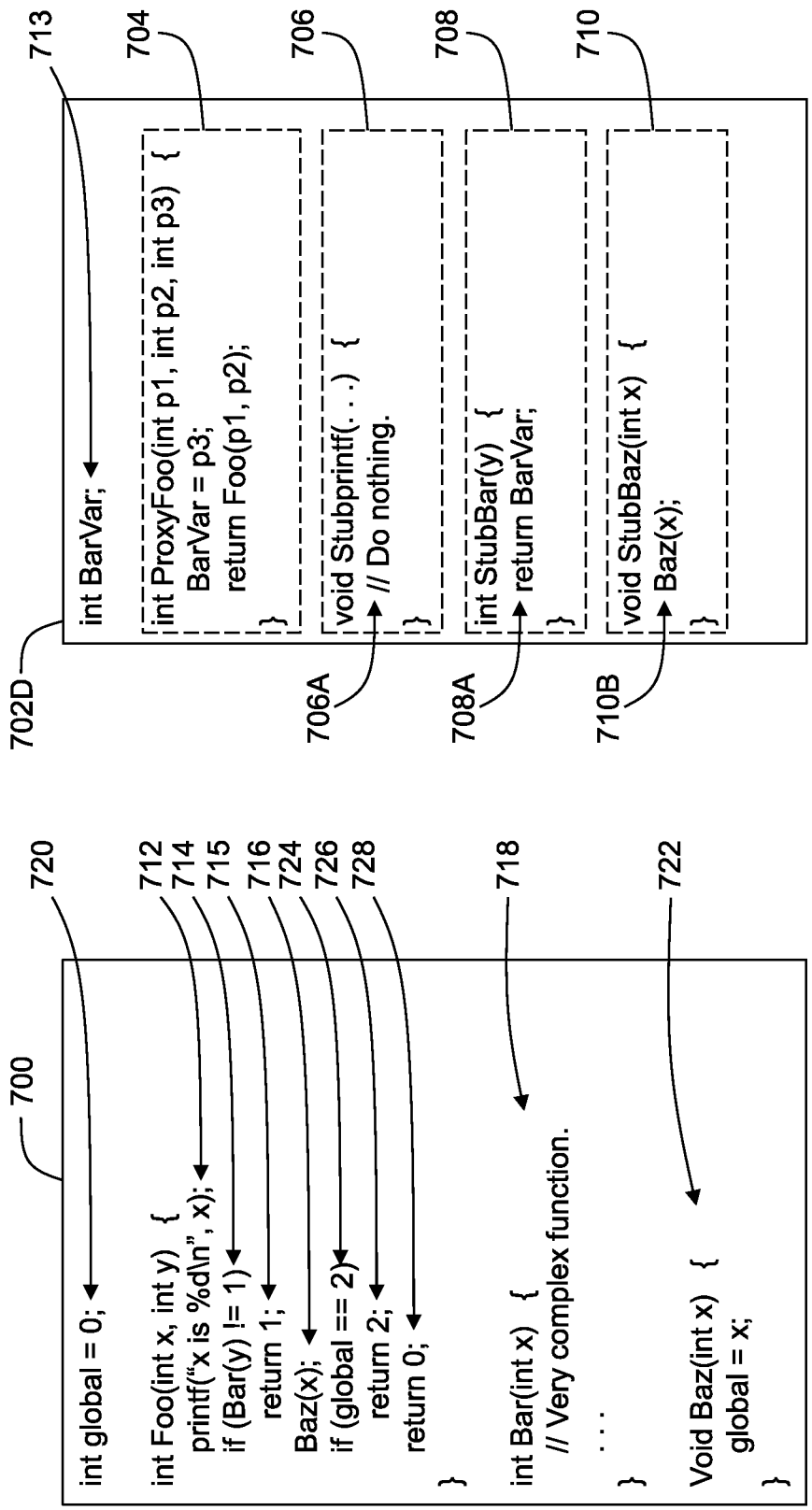
Figure 7E:
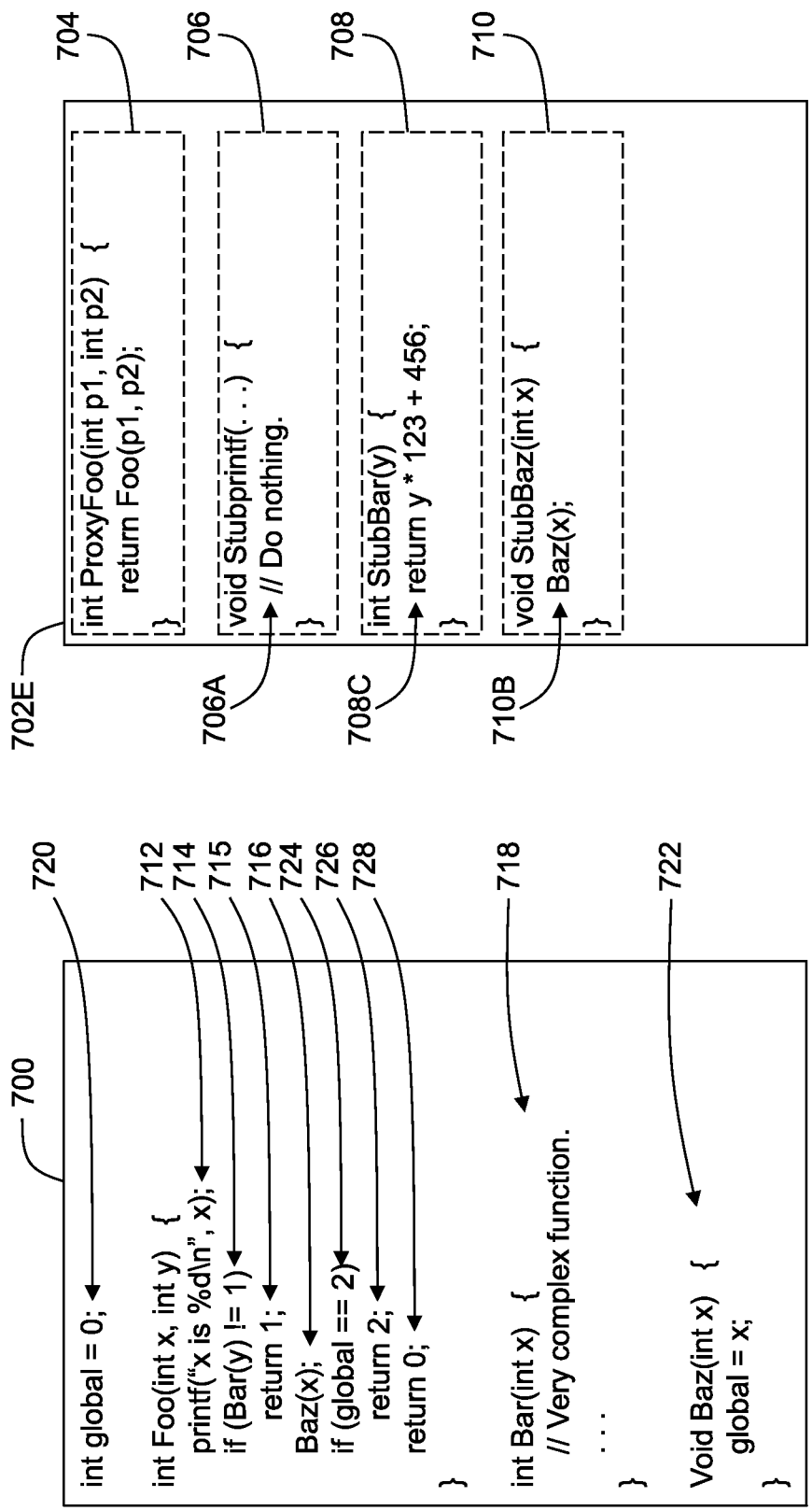

At block 618, it may be determined that not all of the subsets of the test stubs 706, 708, and 710 have been refined, and the method 600B may proceed to block 620 in which, as illustrated in the proxy file 702D of FIG. 7D, a subset including the abstract test stub 710A of the test double proxy 710 may be temporarily refined to an original-behavior test stub 710B. Block 620 may be followed by block 606.

At block 606, the function under test Foo( ) may be symbolically executed using both the original-behavior test stub 710B and the abstract test stubs 706A and 708A in the proxy file 702D. Block 606 may be followed by block 608, and since the method 600B is not on the first iteration using the initial set of test double proxies 706, 708, and 710, the method 600B may proceed to block 612.

The original-behavior test stub 710B may not meaningfully impact the time to symbolically execute the function under test Foo( ) using the original-behavior test stub 710B and the abstract test stubs 706A and 708A since the function Baz( ) is a relatively simple function in the source code 700. As such, the symbolic execution may not time out and the method 600B may proceed to block 614.

The test coverage of the function under test Foo( ) provided by the original-behavior test stub 710B and the abstract test stubs 706A and 708A may be determined to improve test coverage compared to the test coverage provided by all abstract test stubs 706A, 708A, and 710A since the change provided by the original-behavior test stub 710B assigns global to x, where x is parameterized as the symbolic variable p1 in the test proxy 704, thereby allowing previously uncovered line 726 to be covered. For instance, lines 712, 714, 716, 724, and 726 may be covered by (p1, p2, p3)=(2, 0, 1). As such, the original-behavior test stub 710B may be included as a permanent refinement and block 614 may be followed by block 618.

At block 618, it may be determined that all of the subsets of the test stubs 706, 708, and 710 have been refined, and the method 600B may proceed to block 604A in which a refined set of test double proxies 706, 708, and 710 may be generated. In the refined set of test double proxies 706, 708, and 710, the test double proxies 706 and 708 may include the abstract test stubs 706A and 708A while the test double proxy 710 may include the original-behavior test stub 710B. Block 604A may be followed by block 622.

At block 622, it may be determined that the user wants to refine one of the test stubs 706A, 708A, and/or 710B and block 622 may be followed by block 626.

At block 626, the user may provide user input effective to refine the abstract test stub 708A to a user-specified test stub. At block 628, the user input effective to refine the abstract test stub 708A to the user-specified test stub may be received. The user-specified test stub is denoted at 708C in the proxy file 702E of FIG. 7E. Whereas the user-specified test stub 708C may include a smart test stub that approximates the callee function Bar( ), the parameter associated with the abstract test stub 708A may be removed. In particular, reference to the variable BarVar and the symbolic variable p3 may be deleted, as illustrated in the proxy file 702E of FIG. 7E. The parameter associated with the abstract test stub 708A may be removed automatically in response to receiving the user input at block 628, or the parameter may be removed manually by the user providing appropriate user input. Block 628 may be followed by block 606.

Blocks 606-620 may then be iterated using the current refined set of test double proxies 706, 708, and 710, which may include the test double proxy 706 with the abstract test stub 706A, the test double proxy 708 with the user-specified test stub 708C, and the test double proxy 710 with the original-behavior test stub 710B. In the present example, iteration of blocks 606-620 using the current refined set of test double proxies 706, 708, and 710 may not involve any refinements to the test double proxy 708 or the test double proxy 710 since each already includes a refined test stub, e.g., the user-specified test stub 708C and the original-behavior test stub 710B.

The embodiments described herein may include the use of a special purpose or general purpose computer including various computer hardware or software modules, as discussed in greater detail below.

Embodiments described herein may be implemented using computer-readable media for carrying or having computer instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other storage medium which may be used to carry or store desired program code in the form of computer instructions or data structures and which may be accessed by a general purpose or special purpose computer. Combinations of the above may also be included within the scope of computer-readable media.

Computer instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method to generate test double proxies for callee functions of a function under test, the method comprising:
    generating an initial set of test double proxies with abstract test stubs for all callee functions called by a function under test, each of the test double proxies in the initial set of test double proxies corresponding to a different one of the callee functions; and
    generating a first refined set of test double proxies that includes a first refined test stub instead of a first one of the abstract test stubs for a first test double proxy in the initial set of test double proxies in response to determining that refining the first one of the abstract test stubs improves a test coverage of the function under test;
    wherein generating the initial set of test double proxies with the abstract test stubs for all the callee functions called by the function under test comprises, for each of the callee functions, generating:
        a test stub that does nothing if the corresponding one of the callee functions does not return a variable; and
        a parameterized test stub that returns a symbolic variable if a corresponding one of the callee functions returns a variable,
    wherein the method further comprises iteratively refining a current set of test double proxies prior to generating an immediately subsequent refined set of test double proxies, wherein the current set of test double proxies includes the initial set of test double proxies or a refined set of test double proxies that precedes the immediately subsequent refined set of test double proxies; and
    wherein iteratively refining the current set of test double proxies prior to generating the immediately subsequent refined set of test double proxies comprises:
        determining whether all subsets of the abstract test stubs have been refined in the current set of test double proxies;
        in response to determining that all subsets of the abstract test stubs in the current set of test double proxies have been refined, generating the immediately subsequent refined set of test double proxies;
        in response to determining that all subsets of the abstract test stubs in the current set of test double proxies have not been refined, temporarily refining a current subset of the abstract test stubs in the current set of test double proxies that has not been refined;
        symbolically executing the function under test using both a current subset of the current set of test double proxies with the temporarily refined current subset of the abstract test stubs and a current remainder of the current set of test double proxies;
        in response to symbolic execution of the function under test using both the current subset of the current set of test double proxies and the remainder of the current set of test double proxies timing out, or in response to symbolic execution of the function under test using both the current subset of the current set of test double proxies and the remainder of the current set of test double proxies both not timing out and not improving a previous test coverage of the function under test, unrefining the temporarily refined current subset of the abstract test stubs; and
        in response to symbolic execution of the function under test using both the current subset of the current set of test double proxies and the remainder of the current set of test double proxies both not timing out and improving the previous test coverage of the function under test, including the temporarily refined current subset of the abstract test stubs as a permanent refinement in the immediately subsequent refined set of test double proxies.

2. The method of claim 1, further comprising receiving user input effective to refine a second one of the abstract test stubs in the first refined set of test double proxies to a user-specified test stub.

3. The method of claim 2, further comprising, iteratively improving the test double proxies, including, in each of one or more iterations:
    automatically generating a current refined set of test double proxies by refining, in an immediately preceding set of test double proxies, at least one of the abstract test stubs to a refined test stub based on symbolic execution of the function under test; and
    receiving user input effective to refine at least one of the abstract test stubs to a user-specified test stub in the current refined set of test double proxies,
    wherein the current refined set of test double proxies with the user-specified test stub in a current iteration becomes the immediately preceding set of test double proxies in an immediately subsequent iteration.

4. The method of claim 3, wherein refining at least one of the abstract test stubs to a refined test stub comprises replacing the at least one of the abstract test stubs that is refined to the refined test stub with an original-behavior test stub that includes a call to a corresponding one of the callee functions.

5. The method of claim 3, wherein receiving user input effective to refine at least one of the abstract test stubs to a user-specified test stub comprises receiving user input effective to replace the at least one of the abstract test stubs that is refined to the user-specified test stub with a smart test stub that approximates a corresponding one of the callee functions.

6. The method of claim 1, further comprising, prior to generating the first refined set of test double proxies:
symbolically executing the function under test using the initial set of test double proxies;
determining the test coverage of the function under test provided by the initial set of test double proxies;
temporarily refining a subset of the abstract test stubs included in the initial set of test double proxies, including temporarily refining the first one of the abstract test stubs in the first test double proxy to the first refined test stub, wherein the refined subset of the abstract test stubs includes the first refined test stub;
symbolically executing the function under test using both a first subset of the initial set of test double proxies with the temporarily-refined subset of the abstract test stubs and a remainder of the initial set of test double proxies;
determining that the test coverage of the function under test provided by the first subset of the initial set of test double proxies with the temporarily-refined subset of the abstract test stubs and the remainder of the initial set of test double proxies is improved compared to the test coverage provided by the initial set of test double proxies with all abstract test stubs; and
including the temporarily-refined subset of the abstract test stubs as a permanent refinement in the first refined set of test double proxies in response to determining that the test coverage is improved.

7. An apparatus comprising:
a processor; and
a non-transitory computer-readable medium communicatively coupled to the processor and having stored thereon computer instructions comprising:
an abstraction module executable by the processor to generate an initial set of test double proxies with abstract test stubs for all callee functions called by a function under test, each of the test double proxies in the initial set of test double proxies corresponding to a different one of the callee functions;
a refinement module executable by the processor to generate a first refined set of test double proxies that includes a first refined test stub instead of a first one of the abstract test stubs for a first test double proxy in the initial set of test double proxies in response to a determination that refining the first one of the abstract test stubs improves a test coverage of the function under test;
a symbolic execution module;
a test coverage module; and
a user interface module executable by the processor to receive user input effective to refine a second one of the abstract test stubs in the first refined set of test double proxies to a user-specified test stub;
wherein:
the refinement module, the user interface module, the symbolic execution module, and/or the test coverage module are executable by the processor to iteratively refine a current set of test double proxies prior to generating an immediately subsequent refined set of test double proxies;
the current set of test double proxies includes the initial set of test double proxies or a refined set of test double proxies that precedes the immediately subsequent refined set of test double proxies; and
the refinement module, the user interface module, the symbolic execution module, and/or the test coverage module are executable by the processor to iteratively refine the current set of test double proxies as follows:
the refinement module being further executable by the processor to determine, prior to the generation of the immediately subsequent refined set of test double proxies, whether all subsets of the abstract test stubs have been refined in the current set of test double proxies, wherein the refinement module is executable by the processor to generate the immediately subsequent refined set of test double proxies in response to determining that all subsets of the abstract test stubs have been refined in the current set of test double proxies;
in response to determining that all subsets of the abstract test stubs in the current set of test double proxies have not been refined, the refinement module being further executable by the processor to temporarily refine a current subset of the abstract test stubs in the current set of test double proxies that has not been refined;
the symbolic execution module being executable by the processor to symbolically execute, prior to the generation of the immediately subsequent refined set of test double proxies, the function under test using both a current subset of the current set of test double proxies with the temporarily refined current subset of the abstract test stubs and a current remainder of the current set of test double proxies;
in response to symbolic execution of the function under test using both the current subset of the current set of test double proxies and the remainder of the current set of test double proxies timing out, or in response to symbolic execution of the function under test using both the current subset of the current set of test double proxies and the remainder of the current set of test double proxies both not timing out and not improving a previous test coverage of the function under test, the refinement module being further executable by the processor to unrefine, prior to the generation of the immediately subsequent refined set of test double proxies, the temporarily refined current subset of the abstract test stubs; and
in response to symbolic execution of the function under test using both the current subset of the current set of test double proxies and the remainder of the current set of test double proxies both not timing out and improving the previous test coverage of the function under test, the refinement module being further executable by the processor to include the temporarily refined current subset of the abstract test stubs as a permanent refinement in the immediately subsequent refined set of test double proxies.

8. The apparatus of claim 7, wherein the refinement module and the user interface module are executable by the processor to iteratively improve the test double proxies including, in each of one or more iterations:
the refinement module being executable by the processor to automatically generate a current refined set of test double proxies by refining, in an immediately preceding set of test double proxies, at least one of the abstract test stubs to a refined test stub based on symbolic execution of the function under test; and the user interface module being executable by the processor to receive user input effective to refine at least one of the abstract test stubs to a user-specified test stub in the current refined set of test double proxies, wherein the current refined set of test double proxies with the user-specified test stub in a current iteration becomes the immediately preceding set of test double proxies in an immediately subsequent iteration.

9. The apparatus of claim 7, wherein:

the symbolic execution module is executable by the processor to symbolically execute the function under test using the initial set of test double proxies prior to generation of the first refined set of test double proxies;

the test coverage module is executable by the processor to determine the test coverage of the function under test provided by the initial set of test double proxies prior to generation of the first refined set of test double proxies;

the refinement module is further executable by the processor to temporarily refine, prior to generation of the first refined set of test double proxies, a subset of the abstract test stubs, including being executable to temporarily refine the first one of the abstract test stubs in the first test double proxy to the first refined test stub, wherein the refined subset of the abstract test stubs includes the first refined test stub;

the symbolic execution module is further executable by the processor to symbolically execute, prior to generation of the first refined set of test double proxies, the function under test using both a first subset of the initial set of test double proxies with the temporarily-refined subset of the abstract test stubs and a remainder of the initial set of test double proxies;

the test coverage module is further executable by the processor to determine, prior to generation of the first refined set of test double proxies, that the test coverage of the function under test provided by the first subset of the initial set of test double proxies with the temporarily-refined subset of the abstract test stubs and the remainder of the initial set of test double proxies is improved compared to the test coverage provided by the initial set of test double proxies with all abstract test stubs; and the refinement module is further executable by the processor to include the temporarily-refined subset of the abstract test stubs as a permanent refinement in the first refined set of test double proxies in response to determining that the test coverage is improved.

10. A non-transitory computer-readable medium having computer instructions stored thereon that are executable by a processor to perform operations comprising:

generating an initial set of test double proxies with abstract test stubs for all callee functions called by a function under test, each of the test double proxies in the initial set of test double proxies corresponding to a different one of the callee functions;

generating a first refined set of test double proxies that includes a first refined test stub instead of a first one of the abstract test stubs for a first test double proxy in the initial set of test double proxies in response to determining that refining the first one of the abstract test stubs improves a test coverage of the function under test; and receiving user input effective to refine a second one of the abstract test stubs in the first refined set of test double proxies to a user-specified test stub;

wherein generating the initial set of test double proxies with the abstract test stubs for all the callee functions called by the function under test comprises, for each of the callee functions, generating:

a test stub that does nothing if the corresponding one of the callee functions does not return a variable; and a parameterized test stub that returns a symbolic variable if a corresponding one of the callee functions returns a variable, wherein the operations further comprise iteratively refining a current set of test double proxies prior to generating an immediately subsequent refined set of test double proxies, wherein the current set of test double proxies includes the initial set of test double proxies or a refined set of test double proxies that precedes the immediately subsequent refined set of test double proxies; and wherein iteratively refining the current set of test double proxies prior to generating the immediately subsequent refined set of test double proxies comprises:

determining whether all subsets of the abstract test stubs have been refined in the current set of test double proxies;

in response to determining that all subsets of the abstract test stubs in the current set of test double proxies have been refined, generating the immediately subsequent refined set of test double proxies;

in response to determining that all subsets of the abstract test stubs in the current set of test double proxies have not been refined, temporarily refining a current subset of the abstract test stubs in the current set of test double proxies that has not been refined;

symbolically executing the function under test using both a current subset of the current set of test double proxies with the temporarily refined current subset of the abstract test stubs and a current remainder of the current set of test double proxies;

in response to symbolic execution of the function under test using both the current subset of the current set of test double proxies and the remainder of the current set of test double proxies timing out, or in response to symbolic execution of the function under test using both the current subset of the current set of test double proxies and the remainder of the current set of test double proxies both not timing out and not improving a previous test coverage of the function under test, unrefining the temporarily refined current subset of the abstract test stubs; and in response to symbolic execution of the function under test using both the current subset of the current set of test double proxies and the remainder of the current set of test double proxies both not timing out and improving the previous test coverage of the function under test, including the temporarily refined current subset of the abstract test stubs as a permanent refinement in the immediately subsequent refined set of test double proxies.

11. The non-transitory computer-readable medium of claim 10, wherein the operations further comprise, iteratively improving the test double proxies, including, in each of one or more iterations:

automatically generating a current refined set of test double proxies by refining, in an immediately preceding set of test double proxies, at least one of the abstract test stubs to a refined test stub based on symbolic execution of the function under test; and receiving user input effective to refine at least one of the abstract test stubs to a user-specified test stub in the current refined set of test double proxies, wherein the current refined set of test double proxies with the user-specified test stub in a current iteration becomes the immediately preceding set of test double proxies in an immediately subsequent iteration.

12. The non-transitory computer-readable medium of claim 11, wherein:

refining at least one of the abstract test stubs to a refined test stub comprises replacing the at least one of the abstract test stubs that is refined to the refined test stub with an original-behavior test stub that includes a call to a corresponding one of the callee functions; and receiving user input effective to refine at least one of the abstract test stubs to a user-specified test stub comprises receiving user input effective to replace the at least one of the abstract test stubs that is refined to the user-specified test stub with a smart test stub that approximates a corresponding one of the callee functions.

* * * * *